No. 765,586. PATENTED JULY 19, 1904.
W. C. MASON.
FRUIT TREE EXTRACTING AND TRANSPORTING DEVICE.
APPLICATION FILED MAR. 19, 1903.
NO MODEL. 2 SHEETS—SHEET 1.
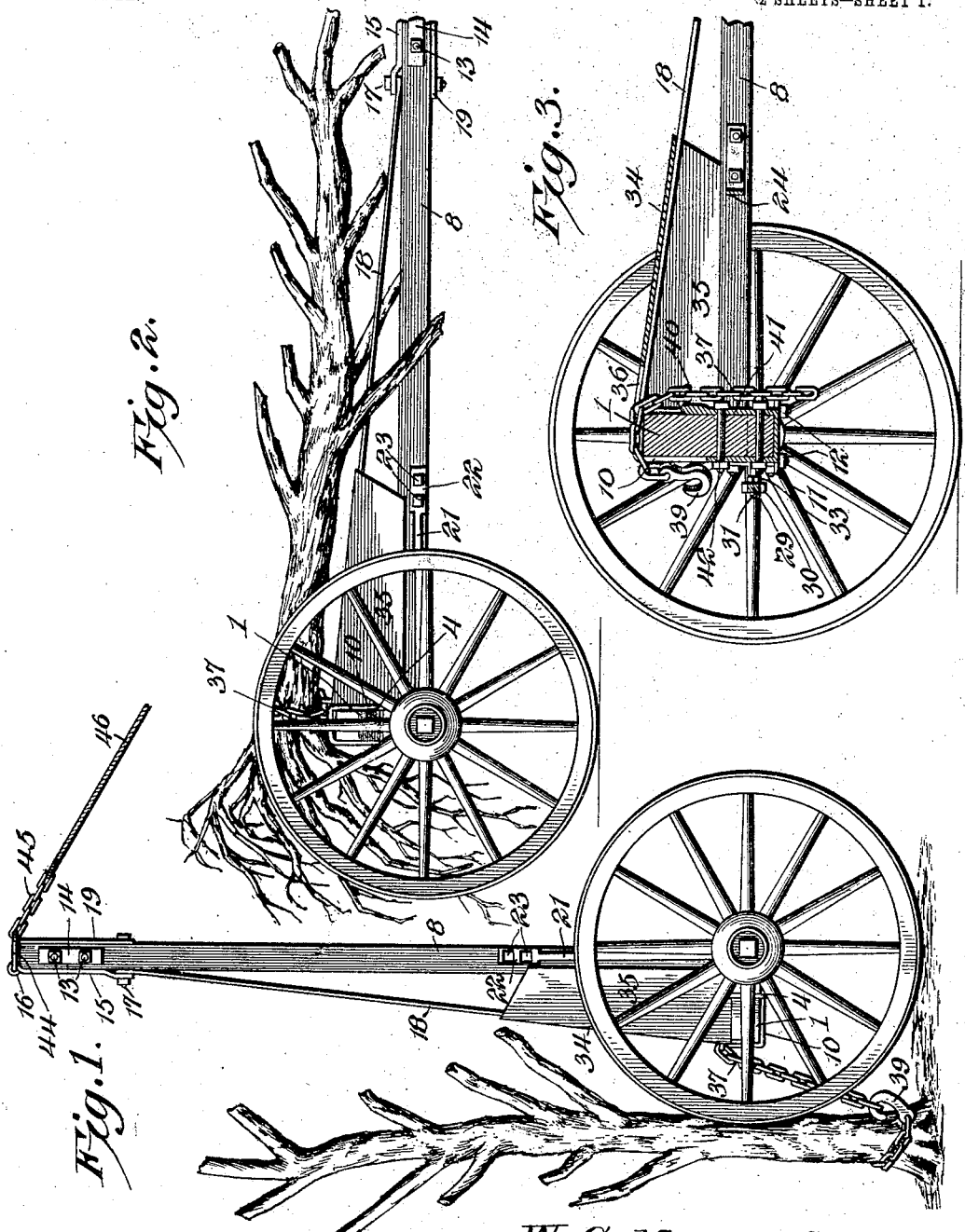
W. C. Mason, Inventor
Witnesses
Howard D. Orr.
J. F. Riley
By E. G. Siggers
Attorney

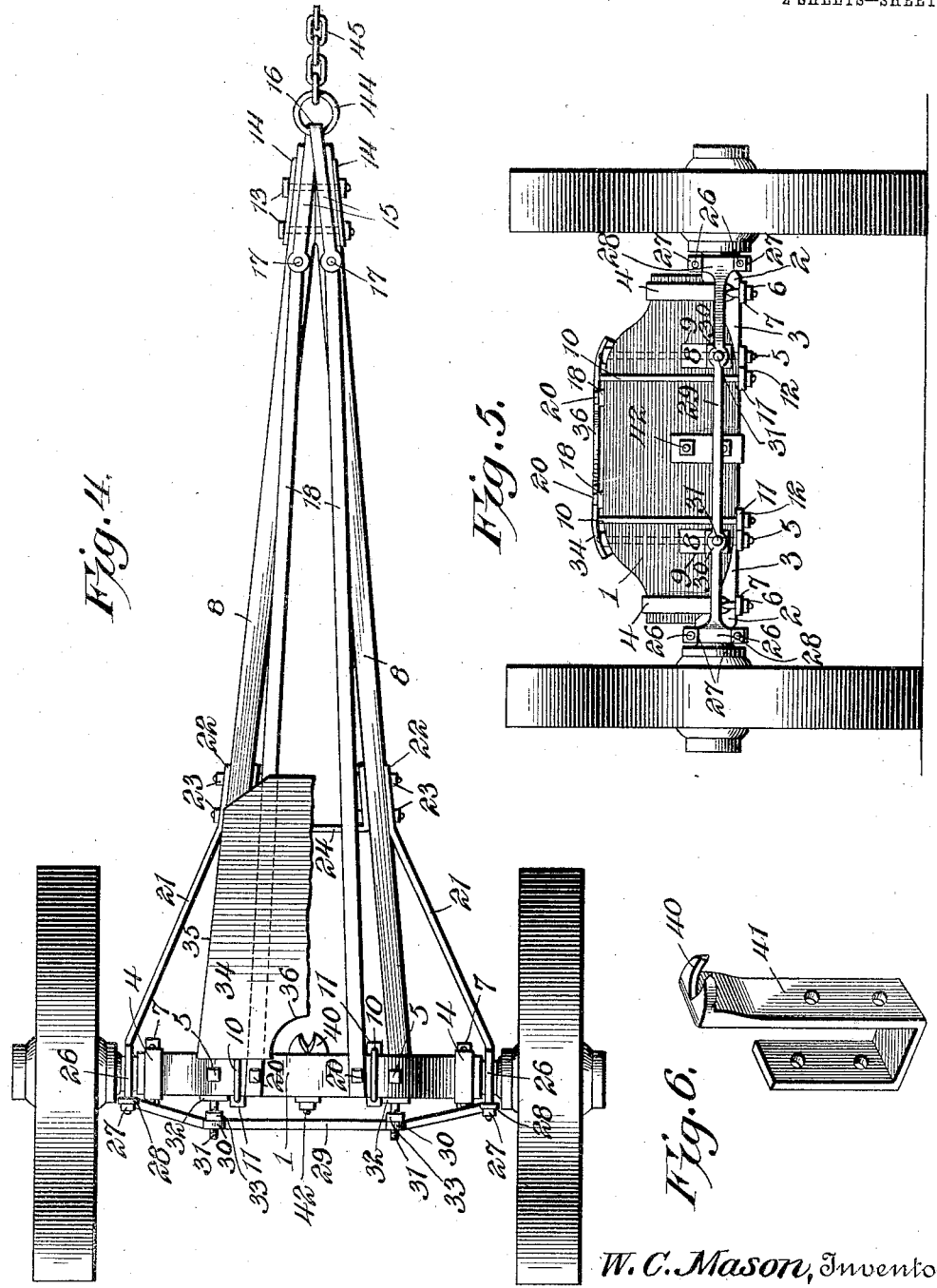

No. 765,586. Patented July 19, 1904.

UNITED STATES PATENT OFFICE.

WILLIAM C. MASON, OF PASADENA, CALIFORNIA.

FRUIT-TREE EXTRACTING AND TRANSPORTING DEVICE.

SPECIFICATION forming part of Letters Patent No. 765,586, dated July 19, 1904.

Application filed March 19, 1903. Serial No. 148,575. (No model.)

*To all whom it may concern:*

Be it known that I, WILLIAM C. MASON, a citizen of the United States, residing at Pasadena, in the county of Los Angeles and State of California, have invented a new and useful Fruit-Tree Extracting and Transporting Device, of which the following is a specification.

The invention relates to a device for extracting and transporting fruit-trees.

The object of the present invention is to improve the construction of devices for extracting and transporting trees and to provide a simple, inexpensive, and efficient one of great strength and durability capable of readily extracting fruit or other trees and adapted to enable an extracted tree to be readily carried from one point to another, whereby trees may be readily transplanted or permanently removed.

With these and other objects in view the invention consists in the novel construction and arrangement of parts hereinafter fully described, illustrated in the accompanying drawings, and particularly pointed out in the claims hereto appended, it being understood that changes in the form, proportion, and minor details of construction within the scope of the claims may be made without departing from the spirit or sacrificing any of the advantages of the invention.

In the drawings, Figure 1 is a side elevation of a device constructed in accordance with this invention and shown in position for extracting a tree. Fig. 2 is a similar view, the parts being arranged for transporting a tree. Fig. 3 is a longitudinal sectional view, the parts being arranged as shown in Fig. 2. Fig. 4 is a plan view, the platform or support being partly broken away to illustrate the construction of the frame of the truck or carriage more clearly. Fig. 5 is a rear elevation. Fig. 6 is a detail view of the chain-engaging device.

Like numerals of reference designate corresponding parts in all the figures of the drawings.

1 designates the body of an axle of a truck or carriage for extracting and transporting trees, and the said body portion 1 is provided at its ends with suitable axle-skeins 2, having arms 3 extending inwardly from the spindles and secured to the ends of the body of the axle by means of outer clips 4 and vertical rods or bolts 5. The arms 3 conform to the configuration of the adjacent end portions of the body of the axle and form partial sockets for the same and are tapered, as clearly shown in Fig. 5. The outer clips 4 embrace the end portions of the body 1, which is extended upwardly between the clips, as shown, to provide a fulcrum and to enable the truck or carriage to operate as a lever in extracting a tree. The clips 4 have lower threaded terminals for the reception of nuts 6, which engage clip-plates 7, connecting the sides with the clips and extending beneath the arms of the axle-skeins. The vertical rods or bolts 5 extend through the intermediate enlarged portion of the body 1 of the axle and pass through suitable perforations of the ends of the arms 3 of the axle-skeins and are provided at their lower ends, which are threaded, with nuts, suitable heads being provided at the upper ends of the rods or bolts for engaging the upper face of the body 1 of the axle. These vertical bolts also pass through rear terminals of forwardly or outwardly converging side or draft bars 8, which have their rear ends fitted in suitable openings 9 of the body 1 of the axle. The body of the axle extends a considerable distance above the bars 8 and the spindle of the axle-skeins, and it will be apparent that the truck or carriage is capable of exerting a powerful leverage in extracting a tree, as the connecting device for engaging a tree extends from the body portion of the axle and the side bars 8 constitute the long arm of the lever. The ends of the arms of the axle-skeins are secured to the body of the axle by inner clips 10, embracing the body 1 and the arms, and provided with clip-plates 11, extending across the bottom of the axle and secured to the clips by nuts 12, arranged on the lower threaded ends of the sides of the clips.

The front or outer ends of the side or draft bars 8 are bolted together by transverse fastening devices 13, plates 14 being arranged at the outer faces of the side or draft bars to receive the heads and nuts of the bolts. The outer end of the side or draft bars are also provided with a clevis, 5, consisting of a metal strap or bar doubled to form an eye 16 and having its sides diverged, as shown in Fig. 4, to conform to the arrangement of the bars 8. The sides of the clevis are secured to the upper faces of the side or draft bars by means of vertical bolts 17, which also serve as the means for securing upper longitudinal braces 18 to the outer portions of the side or draft bars. The side or draft bars are provided at their lower faces with suitable plates 19. The upper longitudinal braces, which are arranged at an inclination when the side or draft bars are in a horizontal position, extend rearward to the top of the body of the axle and are secured to the upper face of the same by the vertical rods or bolts 20. The frame of the truck or carriage is also supported by forwardly-converging side braces 21, consisting of bars having perforations at their front ends 22 for the reception of bolts 23 or other suitable fastening devices for securing the side braces to the bars 8, which are connected by a transverse brace or bar 24. The transverse brace or bar 24 has its terminals bent forwardly and perforated for the reception of the said bolts 23. The rear ends of the side braces are enlarged and forked or bifurcated to form clips 26, which straddle the axle-skeins adjacent to the ends of the body 1. The rear ends of the sides of the clips 26 are threaded for the reception of nuts 27, which secure arms 28 of a rear truss-bar 29 to the axle. The truss-bar 29, which is disposed horizontally in rear of the axle, is provided at its ends with the arms 28, extending upwardly and downwardly from the bar 29 and forming clip-plates for the clips 26 of the side braces 21. The truss-rod is provided equidistant of its ends with eyes 30, receiving struts 31, consisting of threaded stems provided at their front ends with heads or plates 32, fitted against the rear face of the body of the axle, as clearly shown in Fig. 4 of the drawings. The struts are provided with nuts 33, located at the inner face of the truss-bar and adapted to be adjusted to vary the length of that portion of the strut lying between the truss-bar and the body of the axle, whereby the truss-bar is maintained at the desired tension. By this construction and arrangement the frame of the truck or carriage is braced transversely and longitudinally, and it will be apparent that a structure of great strength and durability is provided and that the device may be subjected to great strain in extracting a tree without liability of breaking it.

The truck or carriage is provided with an inclined platform 34, constructed of suitable material and supported by the inclined longitudinal braces and provided with side flanges 35, which are secured to the side bars 8. The rear edge or portion of the platform is also supported by the axle, as clearly shown in the accompanying drawings.

The platform is provided at its rear end with a central recess 36, through which passes a chain 37, which is provided at one end with a hook 39 for enabling the chain to be secured to a tree, as indicated in Fig. 1 of the drawings. In attaching the chain to a tree the outer end of the chain is passed around the tree and the hook is engaged with one of the links. The carriage or truck has its side or draft bars extended upwardly in a perpendicular position, as shown in Fig. 1, preparatory to extracting a tree, and the device is located at one side of the tree. A team is hitched to the outer ends of the draft or side bars and the latter are swung downwardly from the position illustrated in Fig. 1 to that shown in Fig. 2, thereby extracting the tree from the ground. The tree is easily and quickly uprooted and is then secured by the chain to the carriage or truck, as indicated in Fig. 2, whereby the said tree may be readily moved to any desired point.

The chain is adjustably connected with the axle at the inner or front face thereof by means of a horizontally-projecting claw 40, extending outwardly from an enlarged upper end of a bar 41, which is bent to form an approximately oblong bracket or frame. The oblong bracket or frame, which is open at the top, is composed of parallel sides and a bottom connecting portion, and it conforms to the configuration of the body of the axle and is secured to the same by bolts 42 or other suitable fastening devices, which extend entirely through the central portion of the body 1. Any one of the links may be engaged with the claw by arranging one link in the claw and the adjacent link between the same. The link immediately beneath the claw is arranged transversely of the recess or opening of the same and forms stops or shoulders for engaging the lower faces of the sides of the claw.

The clevis receives a ring 44, to which is connected a short chain 45, adapted to receive a rope or cable 46; but any other suitable flexible connection may be employed for hitching a team to the truck or carriage.

What I claim is—

1. A device of the class described comprising wheels, a truck-frame provided with an axle having axle-skeins, a transversely-disposed truss-rod extending longitudinally of the axle and provided at its ends with clip-plates, and clips embracing the axle-skeins and secured to the clip-plates, substantially as described.

2. A device of the class described comprising wheels, an axle receiving the wheels and extended above the same, bars connected with the axle and extending forwardly therefrom, a platform mounted on the bars and having its rear end supported by the axle, and means for connecting the axle with the tree, substantially as described.

3. A device of the class described comprising wheels, and a truck-frame composed of an axle having spindles and extended above the same, converging bars secured to the axle and connected at their front ends, inclined braces extending from the axle to the converging bars, and an inclined platform supported by the braces and located at the rear portion of the truck-frame, substantially as described.

4. A device of the class described comprising wheels, a truck-frame composed of an axle, a platform extending forwardly from the axle and provided at the back with an opening, and means for supporting the platform, a chain-engaging device mounted on the truck-frame and located beneath the opening of the platform, and a chain supported by the axle and extending through the said opening to the chain-engaging device, substantially as described.

5. A device of the class described comprising wheels, a truck-frame constituting a lever and provided with an axle and having a platform extending forwardly from the same, said platform being provided with an opening, a flexible connection supported by the axle and extending through the opening, and means mounted on the truck-frame below the platform for engaging the flexible connection, substantially as described.

6. A device of the class described, comprising wheels, a truck-frame constituting a lever and composed of an axle, converging draft-bars connected with the axle, inclined braces extending from the axle to the draft-bars, and an inclined platform arranged upon the braces supported by the axle and the draft-bars and provided at its back with an opening, a flexible connection supported by the axle and extending through openings, and means mounted on the truck-frame below the opening for engaging the flexible connection, substantially as described.

7. A device of the class described comprising wheels, a truck-frame composed of an axle, and draft-bars connected with the axle, side braces extending from the axle to the draft-bars, a truss-rod arranged in rear of the axle and secured at its ends to the same, and a strut interposed between the truss-rod and the axle, substantially as described.

8. A device of the class described comprising wheels, a truck-frame provided with an axle, side braces secured at their rear ends to the axle, a truss-rod located in rear of the axle, and a strut interposed between the truss-rod and the axle, substantially as described.

9. A device of the class described comprising wheels, a truck-frame provided with an axle and having side or draft bars, inclined side braces extending from the side or draft bars to the axle, a truss-rod located in rear of the axle and secured at its ends to the side braces, and a strut interposed between the truss-rod and the axle, substantially as described.

10. A device of the class described comprising wheels, a truck-frame having an axle, side braces secured to the truck-frame in advance of the axle and provided with forked or bifurcated rear ends receiving the said axle, a truss-rod arranged in rear of the axle and provided at its ends with arms secured to the sides of the forked or bifurcated ends of the side braces, and a strut interposed between the truss-rod and the axle, substantially as described.

11. A device of the class described comprising wheels, a truck-frame composed of an axle, converging draft-bars secured to the axle, inclined longitudinal braces extending from the axle to the draft-bars, side braces secured to the axle and to the draft-bars, a rear truss-rod connected at its ends with the side braces, and struts interposed between the truss-rod and the axle and provided with means for varying the tension of the former, substantially as described.

12. A device of the class described comprising wheels, a truck-frame having an axle, a truss-rod extending longitudinally of the axle and secured at its ends to the same, and struts interposed between the truss-rod and the axle and provided with threaded portions and having nuts arranged on the threaded portions and engaging the truss-rod, substantially as described.

13. A device of the class described comprising wheels, a truck-frame having an axle, a chain-engaging device consisting of a claw, and an open frame or bracket receiving the lower portion of the axle, and a chain engaging the claw, substantially as described.

14. A device of the class described comprising wheels, a truck-frame having an axle and provided with side bars converging from the axle and connected at their front ends, said axle being extended above the side bars, inclined braces extending from the axle to the front portions of the side bars, a clevis consisting of a strap doubled to form an eye and having diverging portions conforming to the configuration of the side bars, and fastening devices passing through the sides of the strap and through the braces and securing the same to the side bars, substantially as described.

In testimony that I claim the foregoing as my own I have hereto affixed my signature in the presence of two witnesses.

WILLIAM C. MASON.

Witnesses:
CLARENCE U. BUNNELL,
PAULINE J. CHRIST.